(12) United States Patent
Kasano et al.

(10) Patent No.: US 8,860,907 B2
(45) Date of Patent: *Oct. 14, 2014

(54) BACKLIGHT UNIT, LIQUID CRYSTAL DISPLAY APPARATUS USING THE SAME, AND LIGHT-EMITTING DIODE USED THEREFOR

(75) Inventors: Masahiro Kasano, Osaka (JP); Kouki Ichihashi, Osaka (JP)

(73) Assignee: Panasonic Corporation, Osaka (JP)

( * ) Notice: Subject to any disclaimer, the term of this patent is extended or adjusted under 35 U.S.C. 154(b) by 273 days.

This patent is subject to a terminal disclaimer.

(21) Appl. No.: 13/401,471

(22) Filed: Feb. 21, 2012

(65) Prior Publication Data

US 2012/0147295 A1 Jun. 14, 2012

Related U.S. Application Data

(63) Continuation of application No. PCT/JP2011/005158, filed on Sep. 14, 2011.

(30) Foreign Application Priority Data

Sep. 14, 2010 (JP) ................. 2010-205123

(51) Int. Cl.
*G02F 1/1335* (2006.01)
(52) U.S. Cl.
CPC .... *G02F 1/133603* (2013.01); *G02F 1/133605* (2013.01)
USPC .................. 349/64; 349/61; 257/98
(58) Field of Classification Search
None
See application file for complete search history.

(56) References Cited

U.S. PATENT DOCUMENTS

| 7,078,735 B2 | 7/2006 | Shono et al. |
| 7,932,527 B2 | 4/2011 | Shono et al. |
| 8,665,397 B2* | 3/2014 | Kasano et al. .................. 349/64 |
| 2003/0214691 A1 | 11/2003 | Magno et al. |
| 2004/0066824 A1 | 4/2004 | Magno et al. |

(Continued)

FOREIGN PATENT DOCUMENTS

| CN | 1666579 A | 9/2005 |
| CN | 101175946 A | 5/2008 |

(Continued)

OTHER PUBLICATIONS

International Search Report issued in International Patent Application No. PCT/JP2011/005158, dated Oct. 11, 2011.

(Continued)

*Primary Examiner* — Richard Kim
(74) *Attorney, Agent, or Firm* — McDermott Will & Emery LLP

(57) ABSTRACT

There are provided light-emitting layer provided on transparent substrate and emitting light of a specific wavelength, first reflecting layer formed on a light exit side relative to light-emitting layer and including a function of reflecting light emitted from light-emitting layer, second reflecting layer provided on a side of substrate in a manner to interpose light-emitting layer between first reflecting layer and second reflecting layer; light diffusion layer that diffuses light emitted from light-emitting layer is disposed between first reflecting layer and second reflecting layer; and second reflecting layer is formed of a high reflective metallic layer formed of a metallic film having a high reflectivity, a low refractive index layer formed of a material film having a low refractive index, and a multilayer-film reflective layer formed by laminating films made of materials having different reflectivity.

23 Claims, 11 Drawing Sheets

(56) References Cited

U.S. PATENT DOCUMENTS

| | | |
|---|---|---|
| 2004/0069995 A1 | 4/2004 | Magno et al. |
| 2005/0230699 A1 | 10/2005 | Wu et al. |
| 2006/0221592 A1 | 10/2006 | Nada et al. |
| 2008/0173863 A1 | 7/2008 | Hahn et al. |
| 2009/0237593 A1 | 9/2009 | Hoshi |
| 2009/0296413 A1 | 12/2009 | Fukui |
| 2010/0084678 A1 | 4/2010 | Streubel et al. |

FOREIGN PATENT DOCUMENTS

| | | | |
|---|---|---|---|
| JP | 04-100277 | A | 4/1992 |
| JP | 2001-007399 | A | 1/2001 |
| JP | 2004-311973 | A | 11/2004 |
| JP | 2005-197289 | A | 7/2005 |
| JP | 2007-258276 | A | 10/2007 |
| JP | 2007-288195 | A | 11/2007 |
| JP | 2009-094199 | A | 4/2009 |
| JP | 2009-238932 | A | 10/2009 |
| JP | 2009-289772 | A | 10/2009 |
| JP | 2010-528479 | A | 8/2010 |
| KR | 10-0752696 | B1 | 8/2007 |

OTHER PUBLICATIONS

N.E.J. Hunt, et al.,: "Extremely Narrow Spectral Widths From Resonant Cavity Light-Emitting Diodes (RCLEDs) Suitable for Wavelength-Division Multiplexing at 1.3μm and 1.55μm", Electron Devices Meeting, 1992, pp. 651-654.

Ray-Hua Horng, et al.,: "Effect of Resonant Cavity in Wafer-Bonded Green InGaN LED With Dielectric and Silver Mirrors", Photonics Technology Letters, vol. 18, Issue 3, 2006, pp. 457-459.

English translation of Chinese Search Report issued in corresponding Chinese Application No. 201180004765.7, dated May 7, 2014.

* cited by examiner

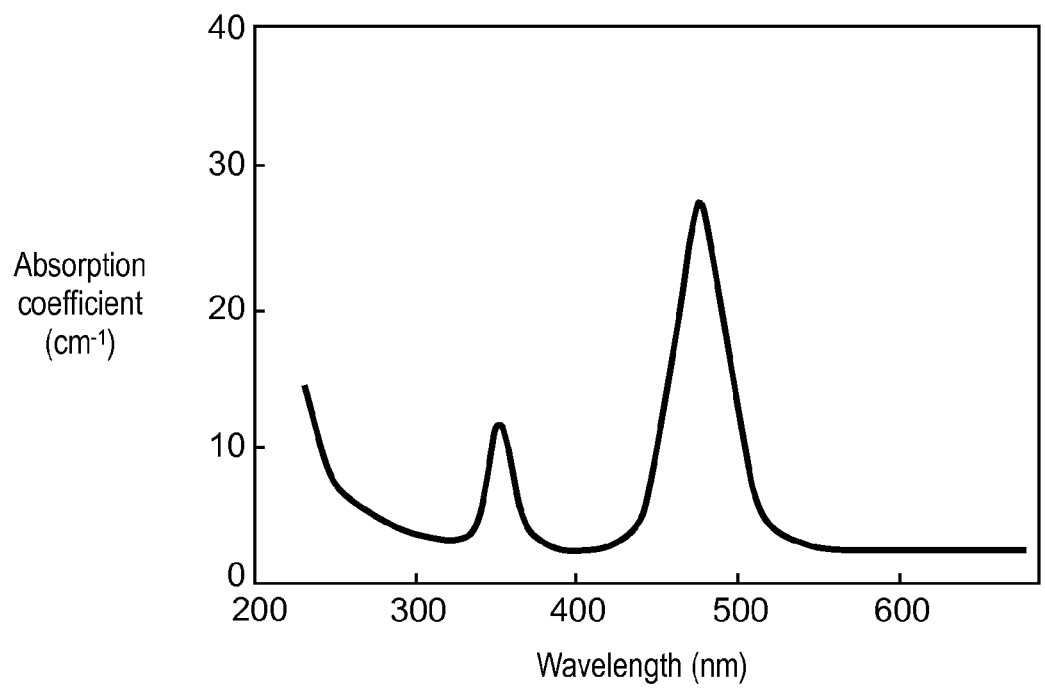

B:(Sr, Ca, Ba, Mg)$_{10}$(PO$_4$)$_6$C$_{12}$:Eu
G:ZnS, : Cu, Al
R:Y$_2$O$_2$S:Eu

BACKLIGHT UNIT, LIQUID CRYSTAL DISPLAY APPARATUS USING THE SAME, AND LIGHT-EMITTING DIODE USED THEREFOR

RELATED APPLICATIONS

This is a continuation application under 35 U.S.C. 111(a) of International Application No. PCT/JP2011/005158, filed on Sep. 14, 2011, which in turn claims the benefit of Japanese Application No. 2010-205123, filed on Sep. 14, 2010, the disclosures of which Applications are incorporated by reference herein.

TECHNICAL FIELD

The present invention relates to a backlight unit, a liquid crystal display apparatus using the same, and a light-emitting diode (hereinafter, referred to as the "LED") used therefor.

BACKGROUND ART

In a backlight unit of a large-sized liquid crystal display apparatus, a plurality of cold-cathode tubes is arranged immediately below a liquid crystal panel. These cold-cathode tubes are used together with members such as a reflecting plate that reflects emitted light from the cold-cathode tubes to a side of the liquid crystal panel and a diffuser plate for diffusing light emitted from the cold-cathode tubes to thereby make a surface light source.

In recent years, a light-emitting diode has been used as a light source of this type of backlight unit. The light-emitting diode has been improved recently in its efficiency and is expected as a light source that consumes less power and replaces a fluorescent lamp. Additionally, when the light-emitting diode is used as a light source of the liquid crystal display apparatus, it is possible to reduce the power consumption of the liquid crystal display apparatus by controlling the brightness of the light-emitting diode according to video images.

Incidentally, as a light-emitting diode for a liquid crystal display apparatus, a type in which a blue light-emitting diode using a GaN semiconductor as an active layer is combined with a phosphor is becoming mainstream.

FIG. 19 is a diagram illustrating a structure of a GaN light-emitting diode disclosed in PTL 1. As illustrated in FIG. 15, in the light-emitting diode, n-type contact layer 32 formed of an n-type GaN film and n-type clad layer 33 are formed on sapphire substrate 31 via a buffer layer (not illustrated). Light-emitting layer 34 formed of an InGaN film is formed on n-type clad layer 33, and p-type clad layer 35 formed of a p-type AlGaN film and p-type contact layer 36 formed of a p-type GaN film are formed on light-emitting layer 34 sequentially from a bottom thereof. N-type electrode 37 is formed on n-type contact layer 32, and p-type electrode 38 is formed on p-type contact layer 36. Light-emitting layer 34 emits light by applying a voltage between n-type electrode 37 and p-type electrode 38.

According to the light-emitting diode disclosed in PTL 1, a largest amount of light is emitted in a front direction of a chip of the light-emitting diode. Therefore, light emitted from the chip in the front direction is diffused by refraction using a lens, through a concave face near an optical axis, so that luminance on an illuminated surface near the optical axis is subdued, and an illumination distribution is made wider.

It is an object of the present invention to provide a light-emitting diode having a light-emitting characteristic with wider distribution of light, a backlight unit that is inexpensive and has a high efficiency using this light-emitting diode, and a liquid crystal display apparatus having an improved image quality using this backlight unit.

CITATION LIST

Patent Literature

PTL 1; Unexamined Japanese Patent Publication No. 2001-7399

SUMMARY OF THE INVENTION

A backlight unit according to the present invention includes light-emitting means that emits light of a specific color; the light-emitting means is a light-emitting diode that includes a light-emitting layer provided on a transparent substrate and emitting light of a specific wavelength, a first reflecting layer formed on a light exit side relative to the light-emitting layer and including a function of reflecting light emitted from the light-emitting layer, and a second reflecting layer provided on a side of the substrate in a manner to interpose the light-emitting layer between the first reflecting layer and the second reflecting layer. A light diffusion layer that diffuses light emitted from the light-emitting layer is disposed between the first reflecting layer and the second reflecting layer, and the second reflecting layer is formed of a high reflective metallic layer formed of a metallic film having a high reflectivity, a low refractive index layer formed of a material film having a low refractive index, and a multilayer-film reflective layer formed by laminating films made of materials having different reflectivity.

A liquid crystal display apparatus according to the present invention includes a backlight unit including light-emitting means that emits light of a specific color, and a liquid crystal panel configured to receive light from the backlight unit incident on a rear side thereof and display an image. The light-emitting means is a light-emitting diode that includes a light-emitting layer provided on a transparent substrate and emitting light of a specific wavelength, a first reflecting layer formed on a light exit side relative to the light-emitting layer and including a function of reflecting light emitted from the light-emitting layer, and a second reflecting layer provided on a side of the substrate in a manner to interpose the light-emitting layer between the first reflecting layer and the second reflecting layer. A light diffusion layer that diffuses light emitted from the light-emitting layer is disposed between the first reflecting layer and the second reflecting layer, and the second reflecting layer is formed of a high reflective metallic layer formed of a metallic film having a high reflectivity, a low refractive index layer formed of a material film having a low refractive index, and a multilayer-film reflective layer formed by laminating films made of materials having different reflectivity.

A light-emitting diode according to the present invention includes a light-emitting layer provided on a transparent substrate and emitting light of a specific wavelength, a first reflecting layer formed on a light exit side relative to the light-emitting layer and including a function of reflecting light emitted from the light-emitting layer, and a second reflecting layer provided on a side of the substrate in a manner to interpose the light-emitting layer between the first reflecting layer and the second reflecting layer. A light diffusion layer that diffuses light emitted from the light-emitting layer is disposed between the first reflecting layer and the second reflecting layer, and the second reflecting layer is formed of a high reflective metallic layer formed of a metallic film having a high reflectivity, a low refractive index layer formed of a material film having a low refractive index, and a multilayer-film reflective layer formed by laminating films made of materials having different reflectivity.

According to the backlight unit configured as described above, it is possible to obtain a backlight unit that is inexpensive, high-efficient, and with reduced color unevenness.

According to the liquid crystal display apparatus that is configured as described above, it is possible to obtain a liquid crystal display apparatus that can improve the image quality.

According to the light-emitting diode configured as described above, it is possible to obtain a light-emitting diode having a light-emitting characteristic with wider distribution of light.

BRIEF DESCRIPTION OF DRAWINGS

FIG. 15 is a diagram illustrating one example of an absorption spectrum of a yellow phosphor.

DESCRIPTION OF EMBODIMENTS

Hereinafter, a backlight unit according to an exemplary embodiment of the present invention will be described with reference to the drawings.

The backlight unit according to the exemplary embodiment is a subjacent-type backlight unit.

Figure 1:
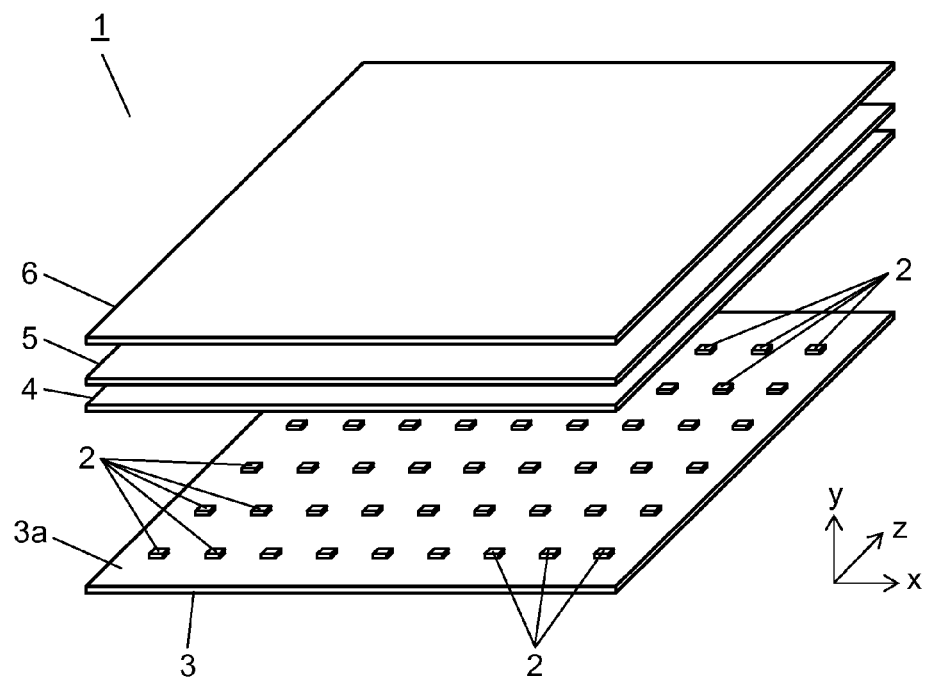
FIG. 1 is a perspective view illustrating an outline structure of a subjacent-type backlight unit according to an exemplary embodiment of the present invention.
Figure 2:
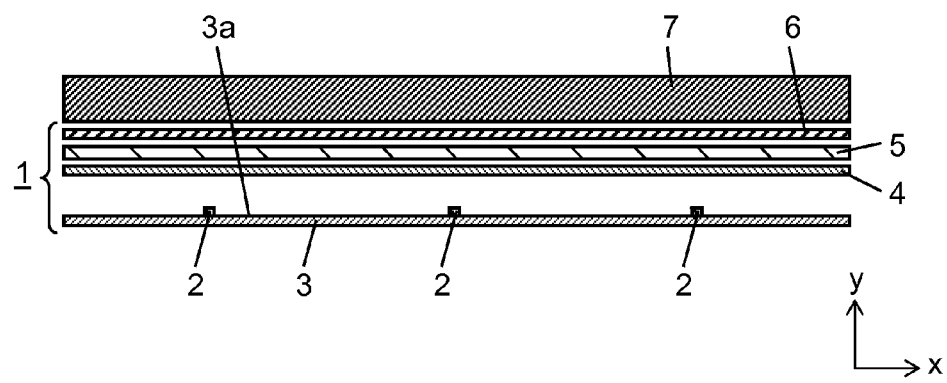
FIG. 2 is a cross sectional view illustrating an outline structure of a liquid crystal display apparatus using the backlight unit.

FIG. 1 is a perspective view illustrating an outline structure of a subjacent-type backlight unit according to the exemplary embodiment of the present invention, and FIG. 2 is a cross sectional view illustrating an outline structure of a liquid crystal display apparatus using the subjacent-type backlight unit illustrated in FIG. 1. FIG. 2 illustrates an outline cross section at a position including an optical axis of the LED in a plane taken along a line x-y of FIG. 1. Hereinafter, referring to FIGS. 1 and 2, a direction of an x-axis is referred to as a "transverse direction", a positive direction of a y-axis is a direction in which light of subjacent-type backlight unit 1 exits is referred to as a "front direction", a negative direction of the y-axis is referred to as a "rear direction", a positive direction of a z-axis is referred to as an "upper direction", and a negative direction of the z-axis is referred to as a "lower direction".

As illustrated in FIGS. 1 and 2, in subjacent-type backlight unit 1, a plurality of LEDs 2 is laid at regular intervals in a matrix formation on a front surface of reflecting plate 3. Various types of optical sheets are disposed on a front direction side of LEDs 2 with a distance from LEDs 2. To be specific, diffusion sheet 4, wavelength conversion sheet 5, and luminance enhancing sheet 6 are arranged on the front direction side of LEDs 2.

Diffusion sheet 4 is a diffusion member that diffuses light from LEDs 2 and light reflected by reflecting plate 3 and forms a surface light source. Wavelength conversion sheet 5 is wavelength conversion means that allows part of light incident thereon through diffusion sheet 4 to pass therethrough and allows mixing the part of the light passing therethrough with other light of which wavelength is changed by wavelength conversion sheet 5 for producing light of white color. Luminance enhancing sheet 6 collects light and allows light to exit therefrom in a direction normal to an exit plane to thereby enhance frontal luminance of the exit light.

LEDs 2 are arbitrarily arranged in an optimum quantity and at optimum intervals according to the structure of subjacent-type backlight unit 1. For example, these are decided by a size and a thickness of subjacent-type backlight unit 1, a light distribution characteristic of LED 2, and the like.

Further, subjacent-type backlight unit 1 allows surface light of white color to exit from a surface on the front direction side of luminance enhancing sheet 6 serving as an exit plane of light. Here, the white color means a color having a color temperature in a range between 3000 K and 10000 K.

Reflecting plate 3 has a flat shape and is arranged on a rear direction side of LEDs 2. Reflecting plate 3 is provided with at least diffusion reflection surface 3a placed on its front surface on which LEDs 2 are laid and formed of white polyester. Light reached diffusion reflection surface 3a is diffused and reflected in a front direction. This means that the light reached reflecting plate 3 is diffused and reflected on the front direction side.

Diffusion sheet 4 has a flat shape and is disposed on the front direction side of LEDs 2 with a distance from LEDs 2 and reflecting plate 3. Diffusion sheet 4 diffuses light incident thereon from a side of LEDs 2, that is, a rear side of diffusion sheet 4. Diffusion sheet 4 controls light so that part of the light passes through diffusion sheet 4 and exits from a front surface in a front direction, and part of the light is reflected by diffusion sheet 4 and returns to a rear side thereof (side of LEDs 2).

Wavelength conversion sheet 5 has substantially a flat shape as an external shape and is disposed between diffusion sheet 4 and luminance enhancing sheet 6 which will be described later. Wave length conversion sheet 5 has a phosphor film therein. The phosphor film is excited by blue light emitted by LEDs 2, converts the light into light of a specific color, that is, converts the wavelength of blue light in this exemplary embodiment into yellow light having a dominant emission wavelength on a long-wavelength side of 550 nm to 610 nm by an action of the phosphor film, and emits the resultant light in the front direction. To state it differently, part of blue light entering from a rear side passes through wavelength conversion sheet 5 intact, and part of the blue light is converted into yellow light by the wavelength conversion action of the phosphor film and passes through wavelength conversion sheet 5. As a result of this, wavelength conversion sheet 5 mixes blue light and yellow light with each other and emits white light. When an amount of the blue light is larger, the resultant light becomes bluish white light, and, when an amount of the yellow light is larger, the resultant light becomes yellowish white light.

Luminance enhancing sheet 6 has a flat shape and is arranged in front of diffusion sheet 4. Luminance enhancing sheet 6 reflects part of incident light to a rear direction, allows part of the incident light to pass therethrough, and collects and emits light in a direction normal to the exit plane. With this arrangement, it increases a frontal luminance of the exit light. Specifically, a prism, for example, is provided in front of luminance enhancing sheet 6 so that only light of a predetermined angle can be outputted.

Subjacent-type backlight unit 1 is formed of the above-mentioned members. Additionally, as illustrated in FIG. 2, a liquid crystal display apparatus is configured when liquid crystal panel 7 for displaying images is placed in the front direction of subjacent-type backlight unit 1. Further, liquid crystal panel 7 is a panel formed to have a plurality of pixels by encapsulating liquid crystal between a substrate on which transparent electrodes and transistors as switching elements are formed and a substrate on which a deflection plate is provided. Then, individual pixels are switched according to an image signal to thereby adjust an amount of the backlight passing through the panel so that a desired image is displayed.

It should be noted that, although FIG. 2 illustrates diffusion sheet 4, wavelength conversion sheet 5, and luminance enhancing sheet 6 with gaps provided therebetween, there is no need to necessarily provide such gaps for arranging individual sheets. This is merely an example.

Next, LED 2 used for the backlight unit according to this exemplary embodiment will be described in detail.

Figure 3:
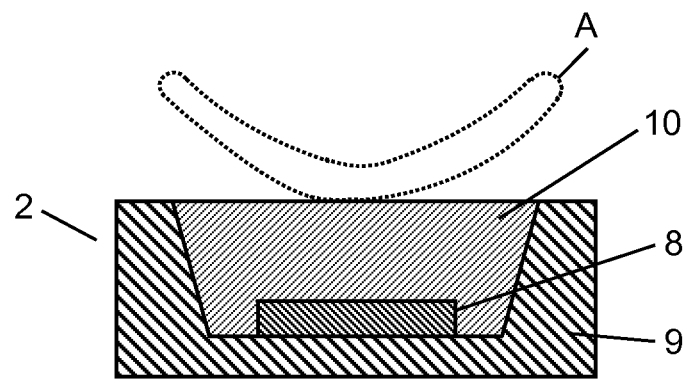
FIG. 3 is a cross sectional view illustrating a structure of an LED used for the backlight unit.

LED 2 emits blue light having a dominant emission wavelength of 430 nm to 480 nm. As illustrated in FIG. 3, LED 2 is formed by arranging LED chip 8 inside LED package 9 and encapsulating by resin 10 for protecting LED chip 8. LED chip 8 is electrically connected to a substrate (not illustrated) of LED package 9 by means of a wiring member. Here, the dominant emission wavelength means a wavelength at which a maximum emission intensity in an emission spectrum is achieved. Referring to FIG. 3, dotted line A schematically indicates an emission pattern of light of LED 2.

Figure 4:
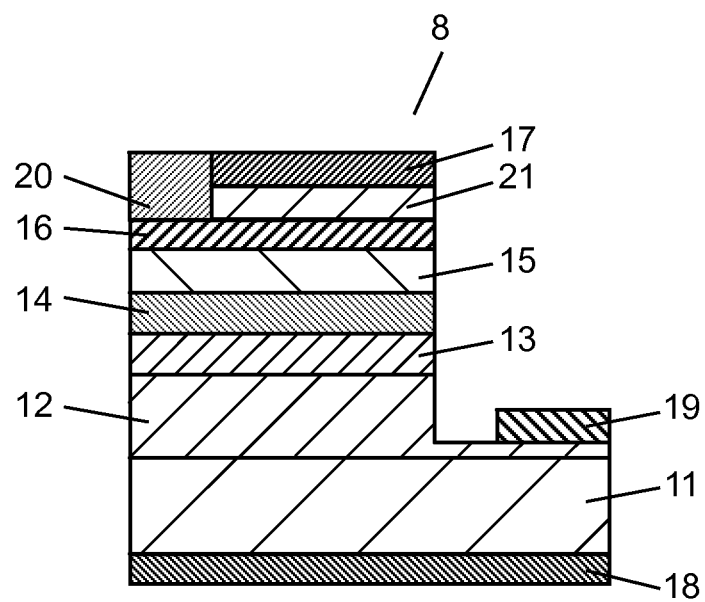
FIG. 4 is a cross sectional view schematically illustrating a structure of an LED chip of the LED.

FIG. 4 is a cross sectional view schematically illustrating a structure of LED chip 8. Referring to FIG. 4, reference mark 11 represents a transparent substrate made of GaN. One of principal surfaces of substrate 11 includes n-type contact layer 12 formed of an n-type GaN film, n-type clad layer 13 formed of an n-type AlGaN film, light-emitting layer 14 which is formed of an InGaN film and is an active layer emitting light of a specific wavelength, p-type clad layer 15 formed of a p-type AlGaN film, and p-type contact layer 16 formed of a p-type GaN film, which are laminated thereon sequentially.

In addition, first reflecting layer 17 having a function of reflecting light emitted from light-emitting layer 14 is laminated on a light exit side relative to light-emitting layer 14 of the laminated body. As described later, first reflecting layer 17 is formed of a dielectric multilayer film. According to this exemplary embodiment, first reflecting layer 17 is formed of a plurality of layers of $TiO_2$ and a plurality of layers of $SiO_2$.

Reference mark 18 represents a second reflecting layer formed of a high reflective metallic layer, a low refractive index layer, and a multilayer-film reflective layer, reference mark 19 represents an n-type electrode, and reference mark 20 represents a p-type electrode.

Second reflecting layer 18 is provided on the other of the principal surfaces of substrate 11, and light-emitting layer 14 is sandwiched between second reflecting layer 18 and first reflecting layer 17.

In addition, light diffusion layer 21 formed of opal glass is formed between first reflecting layer 17 and p-type contact layer 16 formed of p-type GaN film so as to be disposed between first reflecting layer 17 and light-emitting layer 14.

Referring to FIG. 4, light-emitting layer 14 emits light by applying a voltage between n-type electrode 19 and p-type electrode 20. Since light emitted from light-emitting layer 14 is isotropic light, part of the light emitted therefrom travels to second reflecting layer 18 and first reflecting layer 17, part of the light is totally reflected by some of interfaces of the laminated body that forms LED 2, and part of the light is absorbed by some of materials of the laminated body that forms LED 2.

Figure 5:
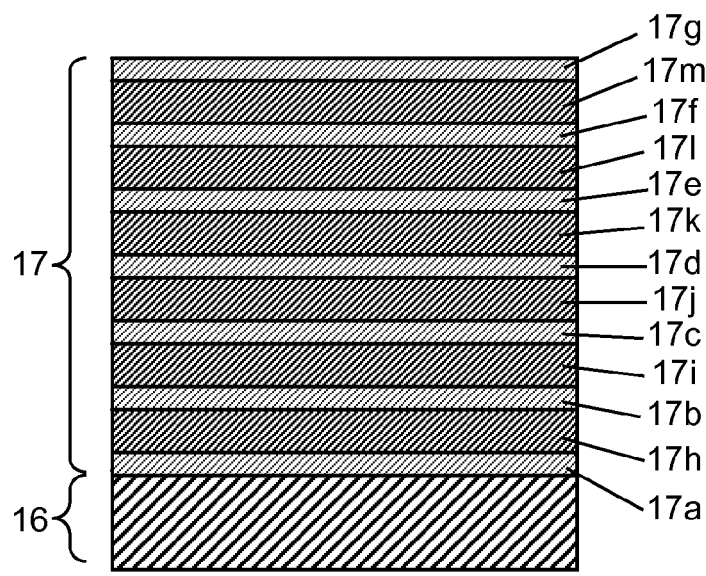
FIG. 5 is a cross sectional view schematically illustrating a structure of a first reflecting layer of the LED chip.

Here, reflectivity of first reflecting layer 17 is configured to be lower than that of second reflecting layer 18. Light emitted by light-emitting layer 14 repeats reflections and is extracted from first reflecting layer 17. FIG. 5 is a cross sectional view of first reflecting layer 17. Referring to FIG. 5, first reflecting layer 17 is formed on p-type contact layer 16 and is formed of a dielectric multilayer film in which seven layers of high refractive index layers 17a, 17b, 17c, 17d, 17e, 17f, and 17g made of titanium dioxide ($TiO_2$) serving as a first dielectric, and six layers of low refractive index layers 17h, 17i, 17j, 17k, 17l, and 17m made of silicon dioxide ($SiO_2$) serving as a second dielectric are laminated alternately on top of one another. High refractive index layers 17a made of titanium dioxide makes contact with p-type contact layer 16.

Here, in high refractive index layers 17a to 17g formed of the first dielectric and low refractive index layers 17h to 17m formed of the second dielectric, which constitute first reflecting layer 17, each optical film thickness is set close to ¼ of a wavelength of the light from light-emitting layer 14 in the first dielectric and the second dielectric.

Specifically, the thicknesses of the layers are, sequentially from a side of p-type contact layer 16, 25.0 nm for high refractive index layer 17a, 83.3 nm for low refractive index layer 17h, 49.0 nm for high refractive index layer 17b, 80.0 nm for low refractive index layer 17i, 47.5 nm for high refractive index layer 17c, 78.3 nm for low refractive index layer 17j, 45.5 nm for high refractive index layer 17d, 73.3 nm for low refractive index layer 17k, 42.0 nm for high refractive index layer 17e, 66.7 nm for low refractive index layer 17l, 38.0 nm for high refractive index layer 17f, 60.0 nm for low refractive index layer 17m, and 18.0 nm for high refractive index layer 17g. Here, a refractive index of titanium dioxide at a wavelength of 450 nm is 2.5, and a refractive index of silicon dioxide at a wavelength of 450 nm is 1.5.

Figure 6:
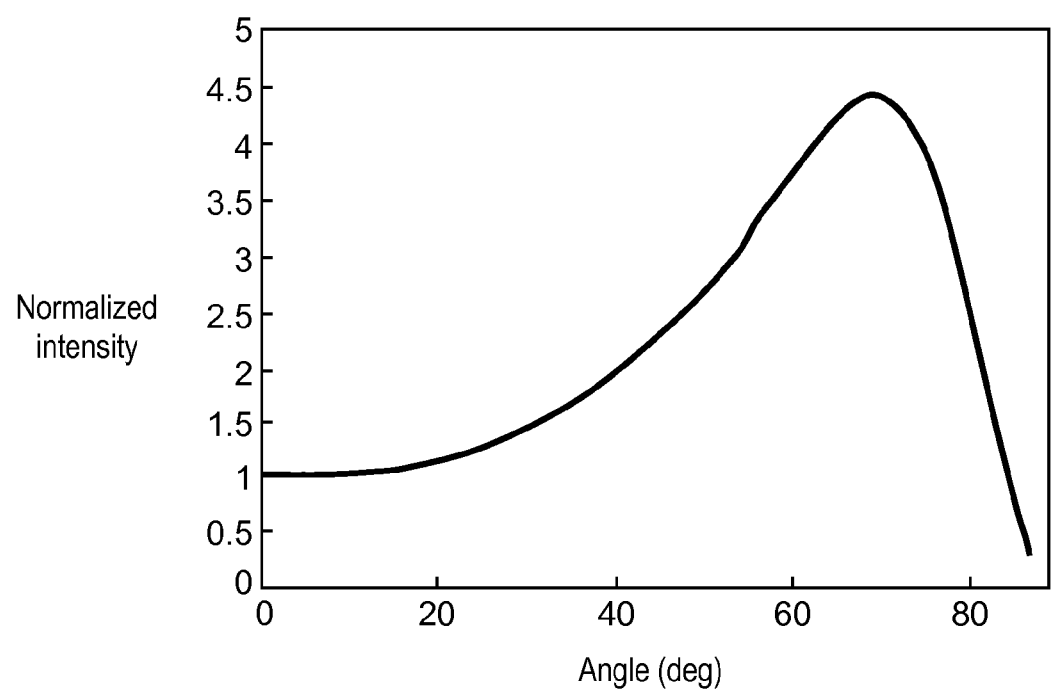
FIG. 6 is a diagram illustrating an angular characteristic of relative intensity of light outputted from the LED.

In this way, by forming first reflecting layer 17 of LED chip 8 by using the dielectric multilayer film formed of the first dielectric and the second dielectric having refractive indices different from each other, it is possible to realize LED 2 having a light distribution characteristic illustrated in FIG. 6.

FIG. 6 is a diagram illustrating an example of an angular characteristic of relative intensity of light outputted from LED 2 having the above-mentioned structure illustrated in FIGS. 4 and 5. In the characteristic illustrated in FIG. 6, light emitted from light-emitting layer 14 is isotropic light. In addition, the characteristic illustrated in FIG. 6 is based on normalization in which intensity of light outputted in the front direction, where an output angle is 0 degrees, is assumed as 1.

Incidentally, when reflecting layers are disposed to sandwich a light-emitting layer in a general LED, a resonator structure is formed by the reflecting layers, and directivity of light outputted from the LED makes a distribution close to Lambertian distribution. Specifically, intensity of light becomes maximum at an output angle of 0 degrees, and an angular distribution proportional to cosine of the output angle is formed.

In contrast, in LED 2 according to this exemplary embodiment, as illustrated in FIG. 6, LED 2 shows a light distribution characteristic with wider distribution in which intensity of light increases as the output angle becomes larger and becomes a maximum at an output angle near 70 degrees which is equal to or larger than 65 degrees.

Specifically, in LED 2 according to this exemplary embodiment, a half of light emitted from light-emitting layer 14 travels to a side of second reflecting layer 18. Light reflected by second reflecting layer 18 travels to a direction of first reflecting layer 17 and exits from LED 2. Light among the emitted light and reflected by first reflecting layer 17 travels to second reflecting layer 18. Since light diffusion layer 21 is disposed between first reflecting layer 17 and second reflecting layer 18, light that incidents on light diffusion layer 21 is subjected to perfect diffusion, and passes therethrough or is reflected thereby. By arranging light diffusion layer 21 as a perfect diffusion layer, multiple reflection of light by first reflecting layer 17 and second reflecting layer 18 is suppressed, and an amount of light confined inside LED 2 can be reduced.

In this way, according to LED 2 of this exemplary embodiment, the multiple reflection of light caused by first reflecting layer 17 and second reflecting layer 18 is suppressed. In addition, a characteristic in which an angular characteristic of transmittance and reflectivity of first reflecting layer 17, i.e., a characteristic in which a peak of transmittance is designed to an output angle of 65 degrees or larger, is provided. Also, by considering a distribution characteristic of light emitted from light-emitting layer 14, the light distribution characteristic of LED 2 can be easily controlled to become a light distribution characteristic with wider distribution as illustrated in FIG. 6.

Next, a detailed structure of second reflecting layer 18 will be described with reference to FIG. 7. Second reflecting layer 18 is formed of high reflective metallic layer 18a which is formed of a metallic film having a high reflectivity selected from among aluminum, gold, and silver, a low refractive index layer 18b formed of a material film having a low refractive index such as silicon dioxide ($SiO_2$) formed on high reflective metallic layer 18a, and multilayer-film reflective layer 18c formed on low refractive index layer 18b and having a structure in which material films formed of a high refractive index material and a low refractive index material having different reflectivity from each other are alternately stacked on top of one another. The high refractive index material of multilayer-film reflective layer 18c is a material selected from a group consisting of titanium dioxide, silicone nitride, ditantalum trioxide, niobium pentoxide, and zirconium dioxide, and the low refractive index material is silicon dioxide. Table 1 indicates one example of a configuration of second reflecting layer 18.

TABLE 1

| | | Film thickness (nm) |
|---|---|---|
| | GaN substrate 11 | — |
| | $TiO_2$ | 45.00 |
| | $SiO_2$ | 75.00 |
| | $TiO_2$ | 45.00 |
| | $SiO_2$ | 75.00 |
| | $TiO_2$ | 45.00 |
| | $SiO_2$ | 75.00 |
| | $TiO_2$ | 45.00 |
| | $SiO_2$ | 75.00 |
| 18c | $TiO_2$ | 45.00 |
| | $SiO_2$ | 75.00 |
| | $TiO_2$ | 45.00 |
| | $SiO_2$ | 75.00 |
| | $TiO_2$ | 45.00 |
| | $SiO_2$ | 75.00 |
| | $TiO_2$ | 45.00 |
| | $SiO_2$ | 75.00 |
| | $TiO_2$ | 45.00 |
| | $SiO_2$ | 75.00 |
| | $TiO_2$ | 45.00 |
| | Low refractive index layer 18b ($SiO_2$) | 825.00 |
| | High reflective metallic layer 18a (Ag) | — |

Hereinafter, a description will be given of effects of individual layers of high reflective metallic layer 18a, low refractive index layer 18b, and multilayer-film reflective layer 18c which form second reflecting layer 18.

Table 2 indicates a structure of layer of high reflective metallic layer 18a alone.

TABLE 2

| | Refractive index | Extinction coefficient | Film thickness |
|---|---|---|---|
| GaN substrate 11 | 2.5 | 0 | — |
| High reflective metallic layer 18a (Ag) | 0.13163 | 2.74674 | — |

Figure 8:
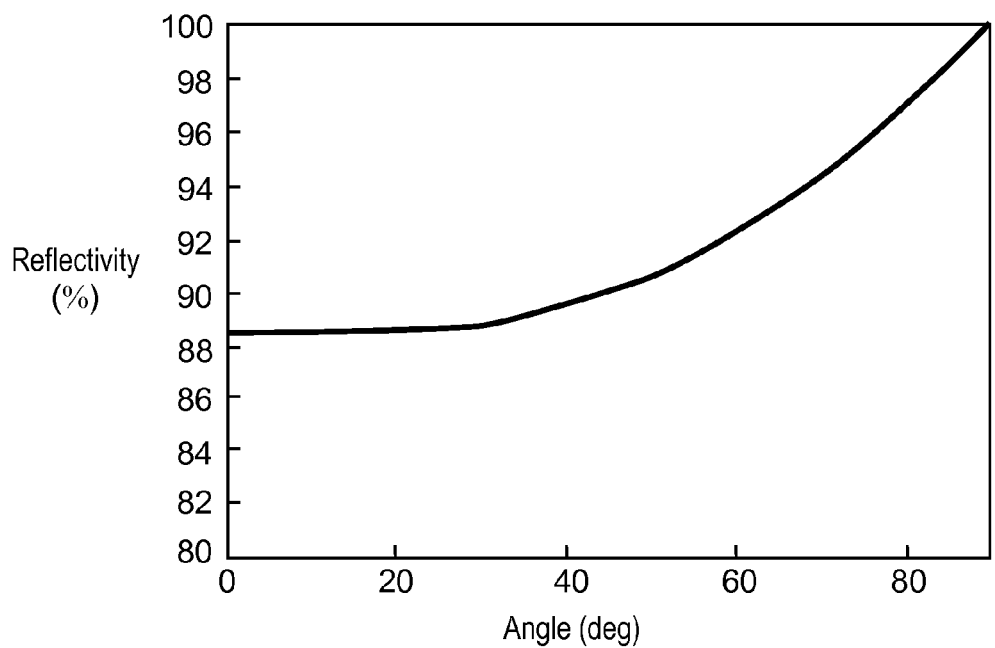
FIG. 8 is a diagram illustrating an angular distribution of the second reflecting layer having a reflectivity according to a configuration indicated in Table 2.

FIG. 8 is a graph illustrating an angular dependency of a reflectivity at a wavelength of 450 nm according to the configuration of Table 2. The reflectivity is about 88% at an angle of 0 degrees, and it is understood that the reflectivity increases as the angle increases.

First, the effect of low refractive index layer 18b will be described. Table 3 indicates configurations of high reflective metallic layer 18a and low refractive index layer 18b. Here, to obtain the effect of low refractive index layer 18b, a medium thereof is a low refractive index layer having a refractive index of 1.5 which is lower than the refractive index of 2.5 and has a thickness as an optical film thickness of 600 nm which is λ/2 or larger of an emitted light wavelength (λ) of 450 nm.

TABLE 3

| | Refractive index | Extinction coefficient | Film thickness |
|---|---|---|---|
| GaN substrate 11 | 2.5 | 0 | — |
| Low refractive index layer 18b | 1.5 | 0 | 600.00 |
| High reflective metallic layer 18a (Ag) | 0.13163 | 2.74674 | — |

Figure 9:
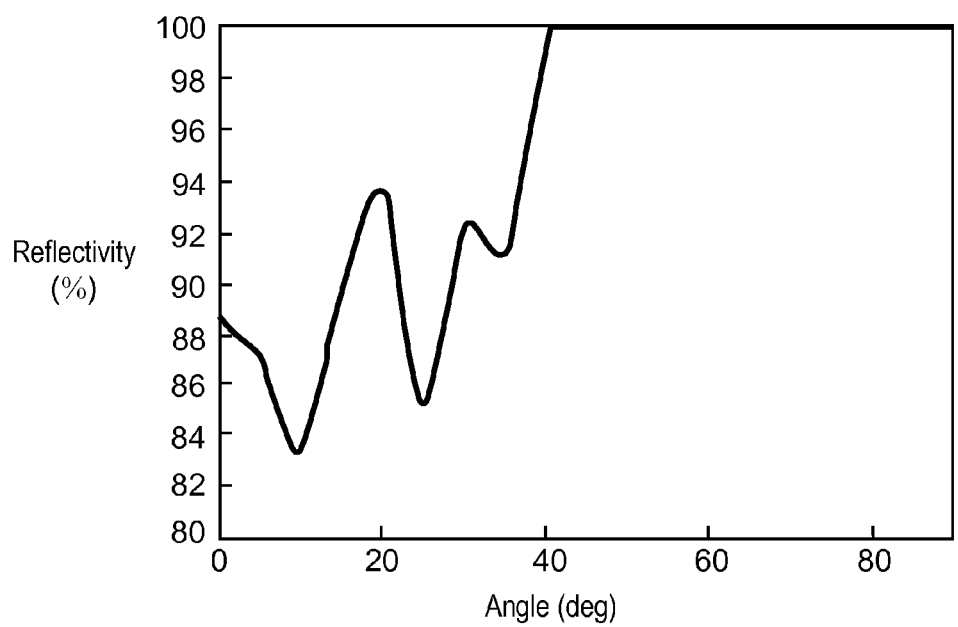
FIG. 9 is a diagram illustrating an angular distribution of the second reflecting layer having a reflectivity according to a configuration indicated in Table 3.

FIG. 9 illustrates a characteristic representing an angular dependency of a reflectivity at a wavelength of 450 nm according to a configuration indicated in Table 3. The reflectivity of light at an angle of 40 degrees or larger is almost 100% due to the effect of low refractive index layer 18b. This coincides with a value close to a critical angle of 37 degrees that is calculated from the refractive index of 2.5 of substrate 11 and the refractive index of 1.5 of low refractive index layer 18b. This means that, since light at an angle over the critical angle is subjected to total reflection, and a reflectivity thereof is 100%, it is possible to improve the reflectivity on a side of a wider angle by using low refractive index layer 18a. In addition, since low refractive index layer 18b uses the total reflection, an influence of a thin-film interference increases, and the effect of the total reflection cannot be obtained when the film thickness becomes small. Accordingly, it is preferable that the thickness of low refractive index layer 18b be the optical film thickness of λ/2 or larger of the emitted light wavelength (λ) of LED 2.

Next, the effect of multilayer-film reflective layer 18c will be described. Table 4 indicates configurations of high reflective metallic layer 18a and multilayer-film reflective layer 18c. Here, medium 1 having a refractive index of 2.5 and medium 2 having refractive index of 3.5 are used as a medium of multilayer-film reflective layer 18c. Extinction coefficients of medium 1 and medium 2 are set to 0. Film thicknesses of medium 1 and medium 2 are set to 45 nm and 32.14 nm, respectively, so that they become λ/4 of a center wavelength of 450 nm of the light emitted by LED 2.

TABLE 4

| | | Refractive index | Extinction coefficient | Film thickness |
|---|---|---|---|---|
| | GaN substrate 11 | 2.5 | 0 | — |
| | Medium 1 | 2.5 | 0 | 45.00 |
| | Medium 2 | 3.5 | 0 | 32.14 |
| | Medium 1 | 2.5 | 0 | 45.00 |
| | Medium 2 | 3.5 | 0 | 32.14 |
| | Medium 1 | 2.5 | 0 | 45.00 |
| | Medium 2 | 3.5 | 0 | 32.14 |
| | Medium 1 | 2.5 | 0 | 45.00 |
| | Medium 2 | 3.5 | 0 | 32.14 |
| | Medium 1 | 2.5 | 0 | 45.00 |
| 18c | Medium 2 | 3.5 | 0 | 32.14 |
| | Medium 1 | 2.5 | 0 | 45.00 |
| | Medium 2 | 3.5 | 0 | 32.14 |
| | Medium 1 | 2.5 | 0 | 45.00 |
| | Medium 2 | 3.5 | 0 | 32.14 |
| | Medium 1 | 2.5 | 0 | 45.00 |
| | Medium 2 | 3.5 | 0 | 32.14 |
| | Medium 1 | 2.5 | 0 | 45.00 |
| | Medium 2 | 3.5 | 0 | 32.14 |
| | Medium 1 | 2.5 | 0 | 45.00 |
| | High reflective metallic layer 18a (Ag) | 0.13163 | 2.74674 | — |

Figure 10:
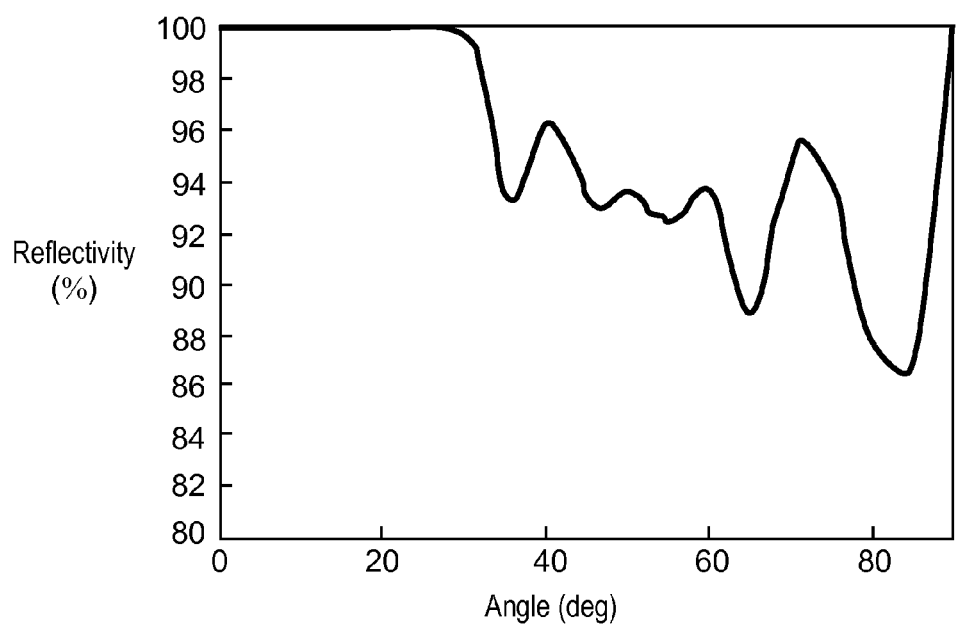
FIG. 10 is a diagram illustrating an angular distribution of the second reflecting layer having a reflectivity according to a configuration indicated in Table 4.

FIG. 10 illustrates a characteristic representing an angular dependency of a reflectivity at a wavelength of 450 nm according to a configuration indicated in Table 4. The reflectivity of light at near 0 degrees is about 100% due to the effect of multilayer-film reflective layer 18c. This is resulted from improvement of the reflectivity by the thin-film interference effect obtained by forming multilayer-film reflective layer 18c using medium 2 having a high refractive index and medium 1 having a low refractive index, and arranging it as a multilayer film having a film thickness of λ/4.

Next, a description will be given of an effect resulted from a combination of low refractive index layer 18b and multilayer-film reflective layer 18c as described above. Table 5 indicates a configuration of second reflecting layer 18 formed of high reflective metallic layer 18a, low refractive index layer 18b, and multilayer-film reflective layer 18c. Here, in the same manner as described above, a medium for low refractive index layer 18b is a low refractive index layer 18b having a refractive index of 1.5 which is lower than the refractive index of 2.5 and has a thickness as an optical film thickness of 880 nm which is λ/2 or larger of the emitted light wavelength (λ) of 450 nm. In addition, for multilayer-film reflective layer 18c, medium 1 having a refractive index of 2.5 and medium 2 having a refractive index of 3.5 are used. Extinction coefficients of medium 1 and medium 2 are set to 0.

Film thicknesses of medium 1 and medium 2 are set to 45 nm and 32.14 nm, respectively, so that they become λ/4 of the emitted light wavelength of 450 nm of the LED.

TABLE 5

| | | Refractive index | Extinction coefficient | Film thickness |
|---|---|---|---|---|
| | GaN substrate 11 | 2.5 | 0 | — |
| | Medium 1 | 2.5 | 0 | 45.00 |
| | Medium 2 | 3.5 | 0 | 32.14 |
| | Medium 1 | 2.5 | 0 | 45.00 |
| | Medium 2 | 3.5 | 0 | 32.14 |
| | Medium 1 | 2.5 | 0 | 45.00 |
| | Medium 2 | 3.5 | 0 | 32.14 |
| | Medium 1 | 2.5 | 0 | 45.00 |
| | Medium 2 | 3.5 | 0 | 32.14 |
| 18 | Medium 1 | 2.5 | 0 | 45.00 |
| | Medium 2 | 3.5 | 0 | 32.14 |
| | Medium 1 | 2.5 | 0 | 45.00 |
| | Medium 2 | 3.5 | 0 | 32.14 |
| | Medium 1 | 2.5 | 0 | 45.00 |
| | Medium 2 | 3.5 | 0 | 32.14 |
| | Medium 1 | 2.5 | 0 | 45.00 |
| | Medium 2 | 3.5 | 0 | 32.14 |
| | Medium 1 | 2.5 | 0 | 45.00 |
| | Medium 2 | 3.5 | 0 | 32.14 |
| | Medium 1 | 2.5 | 0 | 45.00 |
| | Low refractive index layer 18b | 1.5 | 0 | 825.00 |
| | High reflective metallic layer 18a (Ag) | 0.13163 | 2.74674 | — |

Figure 11:
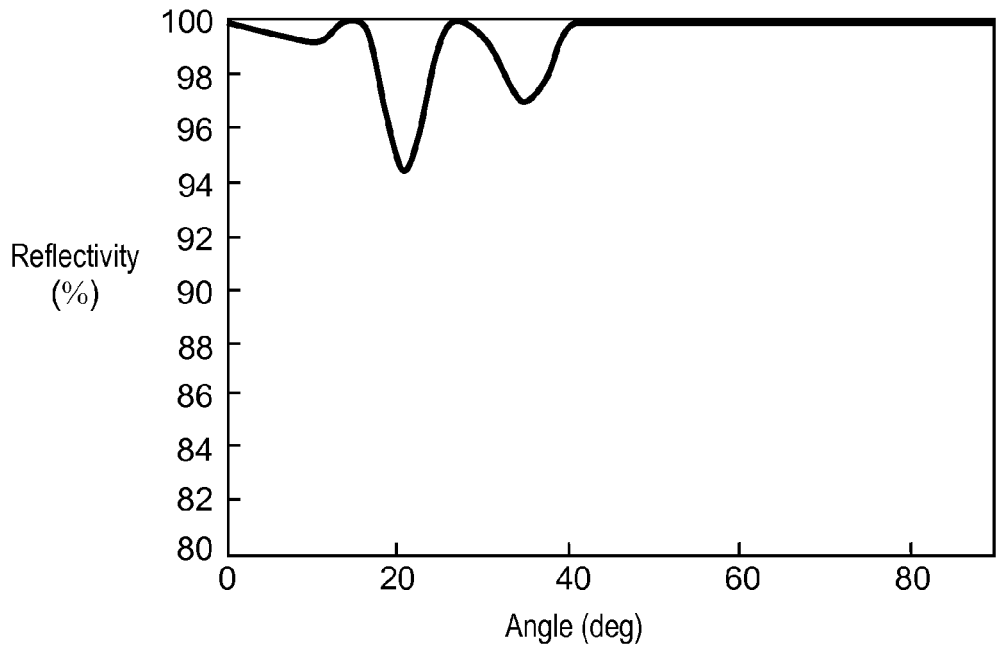
FIG. 11 is a diagram illustrating an angular distribution of the second reflecting layer having a reflectivity according to a configuration indicated in Table 5.

FIG. 11 illustrates a characteristic representing an angular dependency of a reflectivity at a wavelength of 450 nm according to a configuration indicated in Table 5. It is understood that light at an angle of 40 degrees or larger is subjected to total reflection, and the reflectivity thereof is almost 100% by the effect of low refractive index layer 18b. The reflectivity of light at near 0 degrees is about 100% due to the effect of multilayer-film reflective layer 18c. This is resulted from improvement of the reflectivity by the thin-film interference effect obtained by forming multilayer-film reflective layer 18c using medium 2 having a high refractive index and medium 1 having a low refractive index, and arranging it as a multilayer film having a film thickness of λ/4. This means that it is possible to greatly increase the reflectivity at all incident angles by forming second reflecting layer 18 using high reflective metallic layer 18a, low refractive index layer 18b, and multilayer-film reflective layer 18c.

Figure 12:
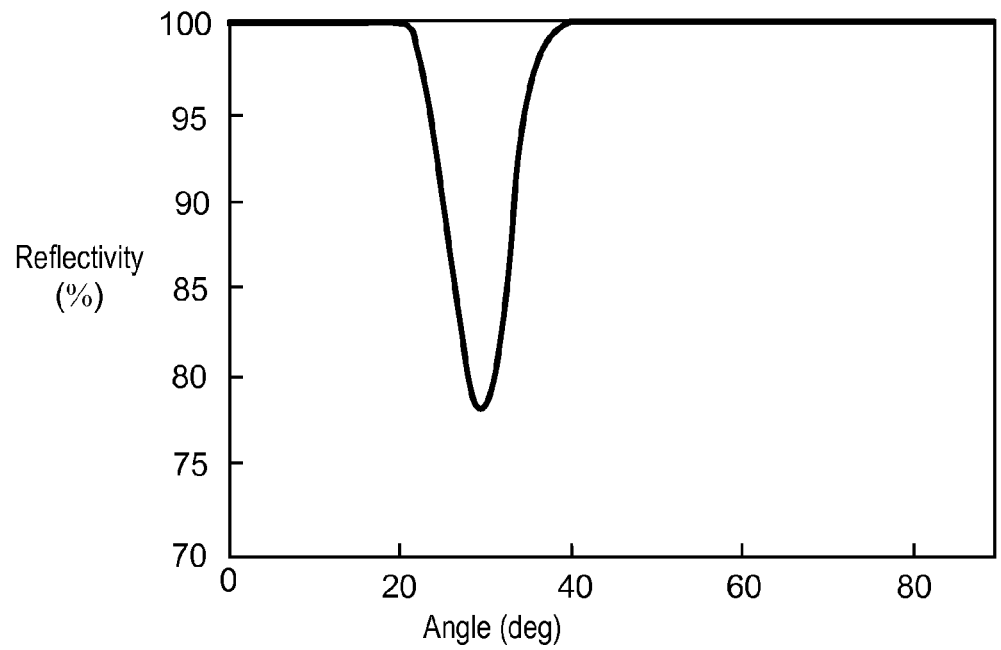
FIG. 12 is a diagram illustrating an angular distribution of the second reflecting layer having a reflectivity according to a configuration indicated in Table 1.

FIG. 12 illustrates a characteristic representing an angular dependency of a reflectivity at a wavelength of 450 nm of second reflecting layer 18 according to a configuration indicated in Table 1. According to the configuration of Table 1, a material of low refractive index layer 18b is $SiO_2$ having a refractive index of 1.5, and a low refractive index material used for multilayer-film reflective layer 18c is $SiO_2$ which is the same material used for low refractive index layer 18b. With the configuration described above, the production process is simplified and the cost is reduced. As in the previous cases, in the angular characteristic of the reflectivity, the reflectivity of light at an angle of 40 degrees or larger is about 100% due to the effect of low refractive index layer 18b, and the reflectivity of light at an angle near 0 degrees is about 100% due to the effect of multilayer-film reflective layer 18c. By forming second reflecting layer 18 using high reflective metallic layer 18a, low refractive index layer 18b, multilayer-film reflective layer 18c, and the reflectivity can be greatly increased.

Further, since light diffusion layer 21 is formed of opal glass, the refractive index is smaller than the refractive index of 2.5 of GaN of light-emitting layer 14. Accordingly, by laying light diffusion layer 21 between light-emitting layer 14 and first reflecting layer 17, it is possible to realize a high extraction efficiency without harming the effect of low refractive index layer 18b of second reflecting layer 18.

As described above, in this exemplary embodiment, the backlight unit includes LED 2 that is light-emitting means for emitting light of specific color and diffusion sheet 4 that is a diffusion member serving as a surface light source for diffusing the light from LED 2; LED 2 includes light-emitting layer 14 provided on transparent substrate 11 and emitting light of a specific wavelength, first reflecting layer 17 formed on a light exit side relative to light-emitting layer 14 and including a function of reflecting light emitted from light-emitting layer 14, and second reflecting layer 18 provided on a side of substrate 11 in a manner to interpose light-emitting layer 14 between first reflecting layer 17 and second reflecting layer 18; and second reflecting layer 18 includes high reflective metallic layer 18a formed of a metallic film having a high reflectivity, low refractive index layer 18b formed of a material film having a low refractive index, and multilayer-film reflective layer 18c resulted from laminating films made of material having different reflectivity. With this structure, since a light interference effect exerted by second reflecting layer 18 and first reflecting layer 17 is suppressed. In addition, an angular characteristic of transmittance and reflectivity of first reflecting layer 17, i.e., a characteristic in which a peak of transmittance is designed to an output angle of 65 degrees or larger. This means that, as illustrated in FIG. 6, it is possible to easily control the characteristic to become a light distribution characteristic with wider distribution, and provide an inexpensive and high-efficient backlight unit.

According to the example illustrated in FIG. 4, although light diffusion layer 21 is disposed between first reflecting layer 17 and light-emitting layer 14, light diffusion layer 21 may be disposed between light-emitting layer 14 and second reflecting layer 18. The point is that light diffusion layer 21 for diffusing light emitted from light-emitting layer 14 may be disposed between first reflecting layer 17 and second reflecting layer 18.

Figure 7:
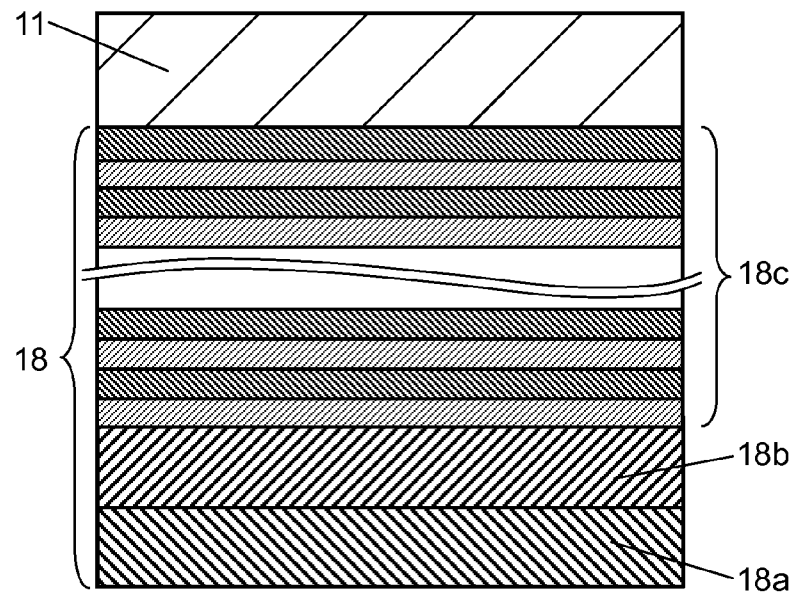
FIG. 7 is a cross sectional view schematically illustrating a structure of a second reflecting layer of the LED chip.

In the example illustrated in FIG. 7, second reflecting layer 18 is sequentially structured of high reflective metallic layer 18a, low refractive index layer 18b formed on high reflective metallic layer 18a, and multilayer-film reflective layer 18c formed on low refractive index layer 18b. Alternatively, the sequential order of low refractive index layer 18b and multilayer-film reflective layer 18c may be replaced with each other. The point is that low refractive index layer 18b and multilayer-film reflective layer 18c may be formed on high reflective metallic layer 18a.

Figure 13:
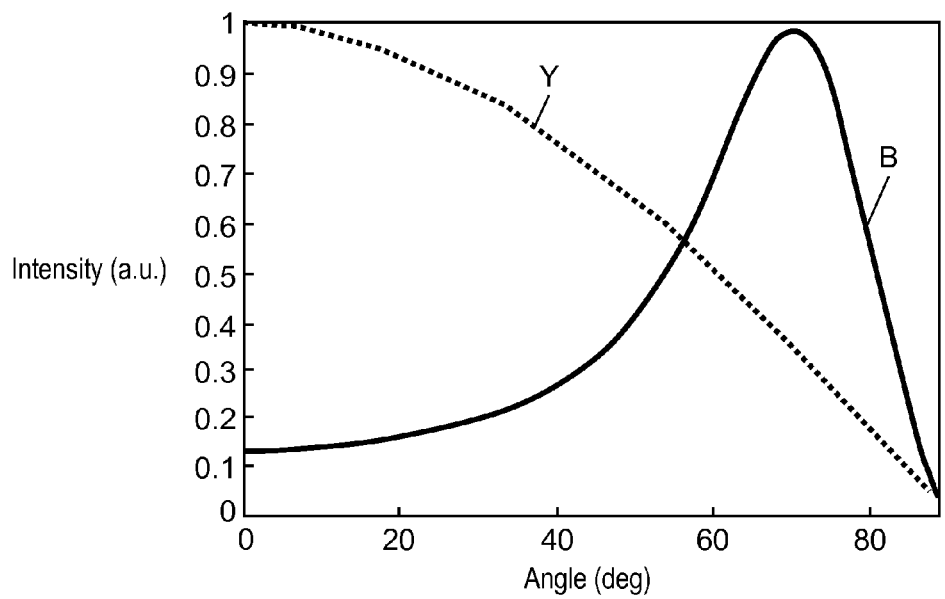
FIG. 13 is a diagram illustrating an angular characteristic of intensity of blue light of the LED and yellow light from a phosphor.

Incidentally, in the case where light itself which is emitted from LED 2 is arranged to be distributed widely without using a lens, blue light emitted from LED chip 8 is widely distributed as indicated by characteristic B in FIG. 13. Alternatively, a light distribution characteristic of yellow light having a dominant emission wavelength between 550 nm and 610 nm which is emitted from a phosphor film that is excited by blue light from LED 2 becomes Lambertian distribution as indicated by characteristic Y. This means that light distribution characteristics of blue light and yellow light outputted from LED package 9 are different from each other, while the yellow light has a maximum value of intensity in a direction immediately above LED 2, the blue light has a maximum value of intensity at an angle of 65 degrees or larger and near 70 degrees. For this reason, the light becomes yellowish white immediately above LED 2 and bluish white at an angle of about 70 degrees. This results in different colors depending on the angle, and causes uneven color.

Figure 14:
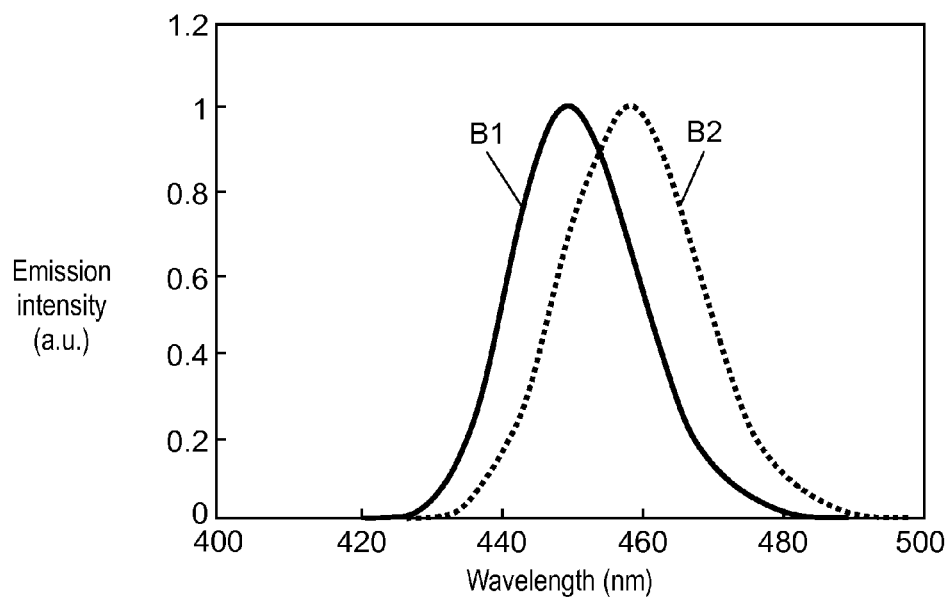
FIG. 14 is a diagram illustrating an emission spectrum at angles of 0 degrees and 60 degrees of blue light emitted from the LED.

Further, when a dielectric multilayer film is used as first reflecting layer 17 on a light exit side so as to widen the light distribution, constructive wavelengths and destructive wavelengths, which are caused by interference of light, are present in the dielectric multilayer film, which results in different emission spectra depending on the angle. FIG. 14 illustrates one example of a spectrum of a blue LED. As illustrated in FIG. 14, it is understood that a spectrum of light B2 outputted in a direction of 60 degrees is shifted by about 10 nm to a longer wavelength side relative to light B1 outputted in a direction of 0 degrees. In addition, as illustrated in FIG. 14, since the emission spectrum changes according to the angle, chromaticity also deviates.

Figure 16A:
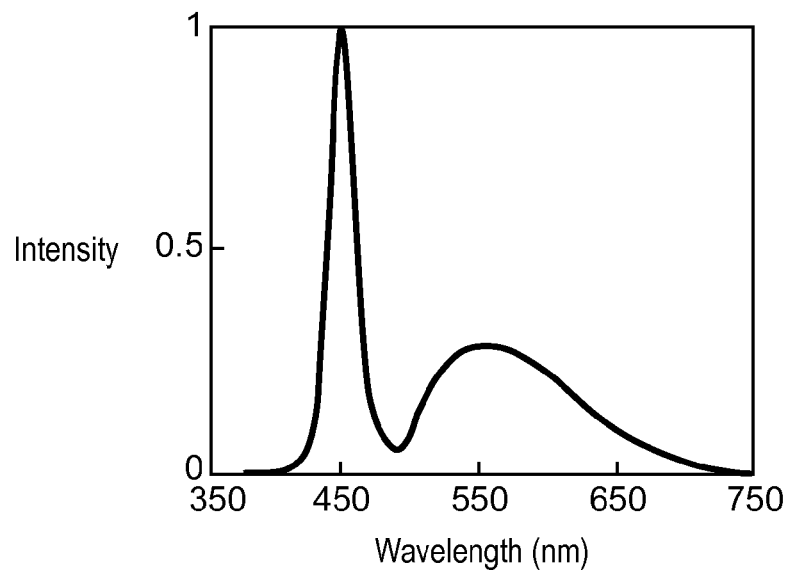
FIG. 16A is a diagram illustrating one example of a spectrum of white light in a 0-degree direction after light passes through a phosphor layer of the LED.
Figure 16B:
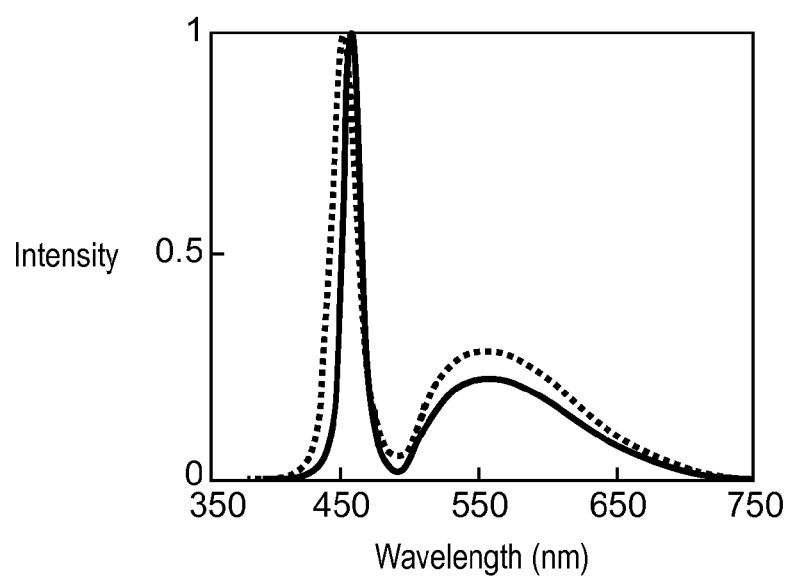
FIG. 16B is a diagram illustrating one example of a spectrum of white light in a 60-degree direction after light passes through a phosphor layer of the LED.

FIG. 15 illustrates one example of an absorption spectrum of a phosphor that emits yellow light. A peak in the absorption spectrum is at around 450 nm as in the case of the emission spectrum in a direction of 0 degrees, and an absorption coefficient decreases on a long wavelength side equal to or higher than 450 nm. This means that an absorption amount of light of the phosphor decreases, and an emission intensity of the yellow phosphor that is excited becomes smaller. Accordingly, light in a direction of 0 degrees after passing through the phosphor has a spectrum illustrated in FIG. 16A, and light in a direction of 60 degrees has a spectrum illustrated in FIG. 16B. According to FIG. 16B, the emission intensity of the yellow phosphor becomes smaller relative to the emission intensity of the blue LED, and the color changes between 0 degrees and 60 degrees, and, as a result, uneven color is caused in the backlight unit.

In contrast, in the backlight unit according to this exemplary embodiment, the blue light outputted from LED 2 shows, as described above, the light distribution characteristic as illustrated in FIG. 6, and blue light having this light distribution characteristic passes through diffusion sheet 4 and enters wavelength conversion sheet 5. Then, part of blue light incident on wavelength conversion sheet 5 passes therethrough intact, and remainder blue light is converted into yellow light by the wavelength conversion action of the phosphor and passes therethrough. During such a process, since the light distribution characteristic of the blue light immediately after it passes wavelength conversion sheet 5 and the yellow light converted by the wavelength conversion action of the phosphor show the same illumination distribution, and additionally the both show the Lambertian distribution characteristic, the blue light and the yellow light show the same characteristic. As a result, the uneven color as discussed above can be suppressed, and an improvement in an image quality for the liquid crystal display apparatus can be achieved.

In the description above, although wavelength conversion sheet 5 is arranged between diffusion sheet 4 and luminance enhancing sheet 6, the location is not restricted to this. For example, wavelength conversion sheet 5 may be arranged between reflecting plate 3 and diffusion sheet 4. In short, if wavelength conversion sheet 5 is arranged between reflecting plate 3 and luminance enhancing sheet 6, it is possible to provide an effect of reducing uneven color.

In addition, if a diffusion plate having a high mechanical strength is used instead of diffusion sheet 4 as a diffusion member, it is possible to allow this diffusion plate to hold other optical sheet. In such a case, wavelength conversion sheet 5 may be arranged between the diffusion plate and luminance enhancing sheet 6.

Although luminance enhancing sheet 6 is configured so that it reflects part of incident light toward a rear side, allows part of incident light to pass therethrough and be collected and emitted in a direction normal to an exit plane, and thereby enhances frontal luminance of the exit light, the structure thereof is not restricted to this. For example, as long as it reflects part of incident light to a rear side, it may be configured differently. Also, it may be configured so that, when a liquid crystal display apparatus is formed, only a polarization component which is absorbed by liquid crystal panel 7 is reflected, and remainder light is allowed to pass through.

Further, in this exemplary embodiment, although wavelength conversion sheet 5 is configured so that it is provided with a phosphor film for converting blue light into yellow light, the structure is not restricted to this. For example, wavelength conversion sheet 5 may be provided with a phosphor film for converting blue light into red light and a phosphor film for converting blue light into green light. According to this structure, it is possible to generate white light by performing a color mixture between blue light from LED 2 which is light emitting means and red and green light whose wavelength is converted by wavelength conversion sheet 5.

Figure 17:
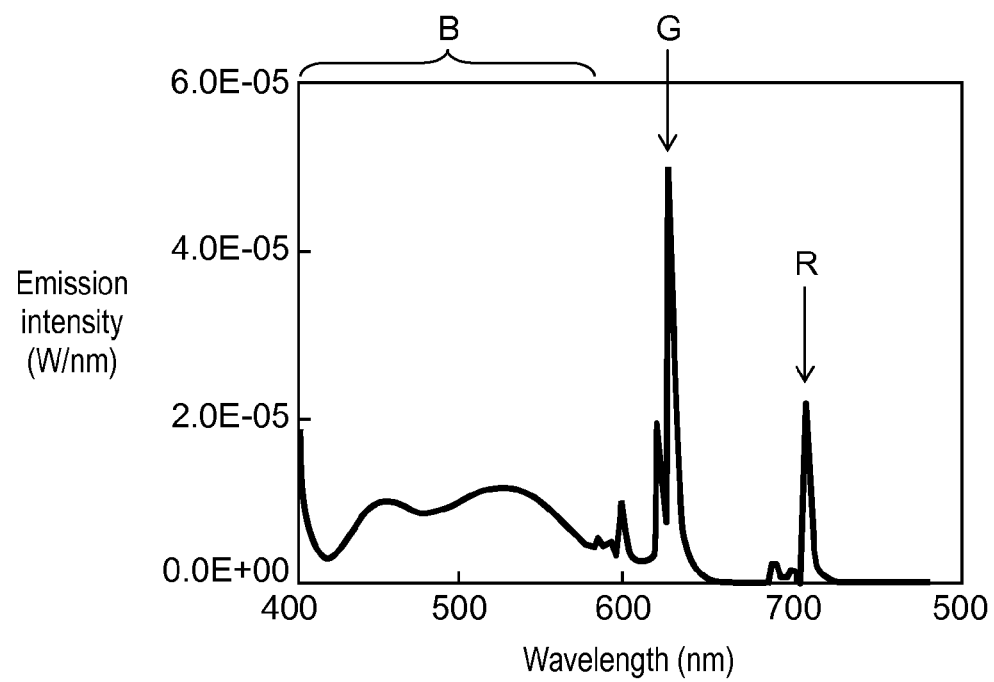
FIG. 17 is a diagram illustrating one example of a spectrum of a white LED resulted from color mixture of light of an ultraviolet light LED, and light of red, blue, and green phosphors.

Further, it is also possible to use an LED as LED 2 which emits ultraviolet light having a dominant emission wavelength of 350 nm to 400 nm. Then, as illustrated in FIG. 17, as wavelength conversion sheet 5, a sheet on which phosphor films of R, G, and B having characteristics of emitting red, blue, and green light by being excited by the ultraviolet light of the LED are formed may be used so that light of white color is achieved by mixing light of blue, green, and red. When the LED emitting the ultraviolet light is used, since the ultraviolet light is not used as part of white color, the uneven color is not affected by the change of chromaticity of LED and is only affected by an excitation efficiency of the phosphor, it is possible to realize a backlight unit having further reduced uneven color.

In addition, as to light diffusion layer 21 of LED chip 8, a plurality of recess and a plurality of protrusion are may be formed at random on a partial surface of p-type contact layer 16, for example, by etching or the like, and a layer made of $SiO_2$ may be formed on a surface of the plurality of recess and a plurality of protrusion to make light diffusion layer 21.

Figure 18:
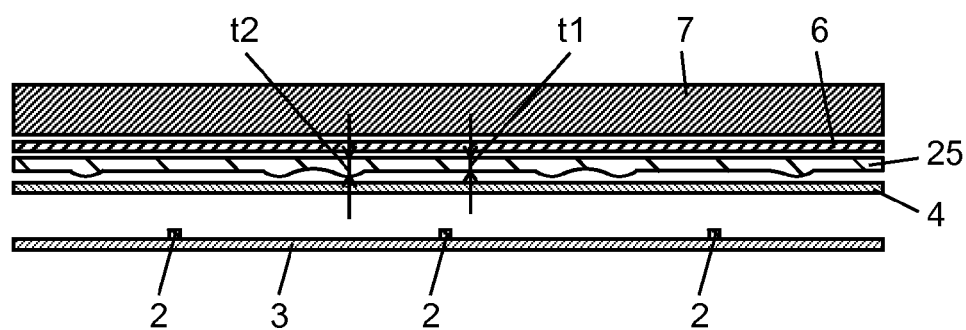
FIG. 18 is a cross sectional view illustrating an outline structure of a liquid crystal display apparatus using a backlight unit according to another exemplary embodiment of the present invention.
Figure 19:
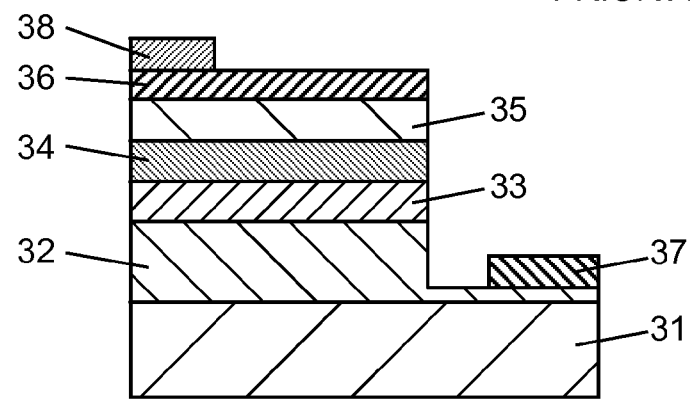
FIG. 19 is a cross sectional view schematically illustrating a structure of an LED chip of a conventional LED.

Next, another exemplary embodiment will be described. FIG. 18 is a cross sectional view illustrating an outline structure of a liquid crystal display apparatus using a subjacent-type backlight unit according to another exemplary embodiment.

In this exemplary embodiment, wavelength conversion sheet 25 is used as the wavelength conversion means that is configured so that a thickness thereof is thicker near an angle where intensity shows a maximum value.

Specifically, as illustrated in FIG. 18, wavelength conversion sheet 25 is configured in such a way that thickness t2 thereof outside an optical axis of LED 2 and near an angle at which intensity of LED 2 shows a maximum value is made thicker than thickness t1 in the optical axis of LED 2. The thickness of wavelength conversion sheet 25 in the optical axis of LED 2 is t1, and the thickness becomes thinner as a location is distanced farther away from the optical axis. Then, the thickness becomes t2 which is larger than t1 at an angle at which a change of chromaticity becomes the largest. Thickness t1 in the optical axis of LED 2 is identical in each LED 2, and the change of thickness of wavelength conversion sheet 25 is distributed concentrically with the optical axis of LED 2 as a center.

In LED 2 according to this exemplary embodiment, when a dielectric multilayer film is used as first reflecting layer 17, constructive wavelengths and destructive wavelengths, which are caused by interference of light, are present, and, when the output angle of LED 2 is different, the spectrum of light becomes different as illustrated in FIG. 14. These cause a reduction in the excitation efficiency of the phosphor, and cause uneven color as a result.

With the structure according to this exemplary embodiment, it is possible to make the emission intensity of the yellow phosphor film almost equal to the emission intensity of the blue light of LED 2, and provide a backlight unit with reduced amount of uneven color.

INDUSTRIAL APPLICABILITY

As described above, the present invention is effective in providing an inexpensive and high-efficient backlight unit and improving an image quality of a liquid crystal display apparatus.

REFERENCE MARKS IN THE DRAWINGS

1 Subjacent-type backlight unit
2 LED
3 Reflecting plate
4 Diffusion sheet
5,25 Wavelength conversion sheet
6 Luminance enhancing sheet
7 Liquid crystal panel
8 LED chip
9 LED package
10 Resin
11 Substrate
12 n-type contact layer
13 n-type clad layer
14 Light-emitting layer
15 p-type clad layer
16 p-type contact layer
17 First reflecting layer
17a to 17g High refractive index layer
17h to 17m Low refractive index layer
18 Second reflecting layer
18a High reflective metallic layer 18b Low refractive index layer
18c Multilayer-film reflective layer
19 n-type electrode
20 p-type electrode
21 Light diffusion layer

The invention claimed is:

1. A backlight unit comprising light-emitting means that emits light of a specific color,
wherein the light-emitting means is a light-emitting diode that includes:
a light-emitting layer provided on a transparent substrate and emitting light of a specific wavelength;
a first reflecting layer formed on a light exit side relative to the light-emitting layer and including a function of reflecting light emitted from the light-emitting layer; and
a second reflecting layer provided on a side of the substrate in a manner to interpose the light-emitting layer between the first reflecting layer and the second reflecting layer, and
wherein a light diffusion layer that diffuses light emitted from the light-emitting layer is disposed between the first reflecting layer and the second reflecting layer, and
the second reflecting layer is formed of a high reflective metallic layer formed of a metallic film having a high reflectivity, a low refractive index layer formed of a material film having a low refractive index, and a multilayer-film reflective layer formed by laminating films made of materials having different reflectivity.

2. The backlight unit according to claim 1 further comprising wavelength conversion means configured to allow part of light from the light-emitting means to pass therethrough, and convert the light into light of a specific color such that light of white color is formed by a mixture with the light that is allowed to pass therethrough.

3. The backlight unit according to claim 2,
wherein the light-emitting means is a blue light-emitting diode that emits blue light having a dominant emission wavelength of 430 nm to 480 nm, and the wavelength conversion means includes a phosphor film that, by being excited by light of the blue light-emitting diode, emits light of a specific color which forms light of white color by being mixed with light of blue color.

4. The backlight unit according to claim 2,
wherein the light-emitting means is a light-emitting diode that emits ultraviolet light having a dominant emission wavelength of 350 nm to 400 nm, and the wavelength conversion means includes phosphor films that are excited by ultraviolet light of the light-emitting diode and individually emit light of red, blue, and green colors.

5. The backlight unit according to claim 1,
wherein the second reflecting layer is formed by disposing the low refractive index layer on the high reflective metallic layer, and disposing the multilayer-film reflective layer on the low refractive index layer.

6. The backlight unit according to claim 1,
wherein a film thickness of the low refractive index layer of the second reflecting layer has an optical film thickness of $\lambda/2$ or greater with respect to a center wavelength ($\lambda$) of light emitted by the light-emitting diode.

7. The backlight unit according to claim 1,
wherein the multilayer-film reflective layer of the second reflecting layer is formed by laminating a high refractive index material and a low refractive index material.

8. The backlight unit according to claim 7,
wherein the high refractive index material is a material selected from a group consisting of titanium dioxide, silicone nitride, di-tantalum trioxide, niobium pentoxide, and zirconium dioxide, and the low refractive index material is silicon dioxide.

9. The backlight unit according to claim 1,
wherein the first reflecting layer is formed of a dielectric multilayer film.

10. The backlight unit according to claim 1,
wherein the light diffusion layer is disposed between the first reflecting layer and the light-emitting layer.

11. The backlight unit according to claim 1,
wherein the high reflective metallic layer of the second reflecting layer is formed of a metal selected from among aluminum, gold, and silver.

12. The backlight unit according to claim 1,
wherein the first reflecting layer of the light-emitting diode is configured to have a peak of transmittance when an output angle is 65 degrees or larger.

13. A liquid crystal display apparatus comprising:
a backlight unit including light-emitting means that emits light of a specific color; and
a liquid crystal panel configured to receive light from the backlight unit incident on a rear side thereof and display an image,
wherein the light-emitting means is a light-emitting diode that includes:
a light-emitting layer provided on a transparent substrate and emitting light of a specific wavelength;
a first reflecting layer formed on a light exit side relative to the light-emitting layer and including a function of reflecting light emitted from the light-emitting layer; and
a second reflecting layer provided on a side of the substrate in a manner to interpose the light-emitting layer between the first reflecting layer and the second reflecting layer, and
wherein a light diffusion layer that diffuses light emitted from the light-emitting layer is disposed between the first reflecting layer and the second reflecting layer, and
the second reflecting layer is formed of a high reflective metallic layer formed of a metallic film having a high reflectivity, a low refractive index layer formed of a material film having a low refractive index, and a multilayer-film reflective layer formed by laminating films made of materials having different reflectivity.

14. The liquid crystal display apparatus according to claim 13,
wherein the backlight unit includes wavelength conversion means configured to allow part of light from the light-emitting means to pass therethrough, and convert the light into light of a specific color such that light of white color is formed by a mixture with the light that is allowed to pass therethrough.

15. A light-emitting diode comprising:
a light-emitting layer provided on a transparent substrate and emitting light of a specific wavelength;
a first reflecting layer formed on a light exit side relative to the light-emitting layer and including a function of reflecting light emitted from the light-emitting layer; and
a second reflecting layer provided on a side of the substrate in a manner to interpose the light-emitting layer between the first reflecting layer and the second reflecting layer,
wherein a light diffusion layer that diffuses light emitted from the light-emitting layer is disposed between the first reflecting layer and the second reflecting layer, and
the second reflecting layer is formed of a high reflective metallic layer formed of a metallic film having a high reflectivity, a low refractive index layer formed of a material film having a low refractive index, and a multilayer-film reflective layer formed by laminating films made of materials having different reflectivity.

16. The light-emitting diode according to claim 15, wherein the second reflecting layer is formed by disposing the low refractive index layer on the high reflective metallic layer, and disposing the multilayer-film reflective layer on the low refractive index layer.

17. The light-emitting diode according to claim 15, wherein a film thickness of the low refractive index layer of the second reflecting layer has an optical film thickness of $\lambda/2$ or greater with respect to a center wavelength ($\lambda$) of light emitted by the light-emitting diode.

18. The light-emitting diode according to claim 15, wherein the multilayer-film reflective layer of the second reflecting layer is formed by laminating a high refractive index material and a low refractive index material.

19. The light-emitting diode according to claim 18, wherein the high refractive index material is a material selected from a group consisting of titanium dioxide, silicone nitride, di-tantalum trioxide, niobium pentoxide, and zirconium dioxide, and the low refractive index material is silicon dioxide.

20. The light-emitting diode according to claim 15, wherein the first reflecting layer is formed of a dielectric multilayer film.

21. The light-emitting diode according to claim 15, wherein the light diffusion layer is disposed between the first reflecting layer and the light-emitting layer.

22. The light-emitting diode according to claim 15, wherein the high reflective metallic layer of the second reflecting layer is formed of a metal selected from among aluminum, gold, and silver.

23. The light-emitting diode according to claim 15, wherein the first reflecting layer of the light-emitting diode is configured to have a peak of transmittance when an output angle is 65 degrees or larger at a dominant emission wavelength from the light emitting layer.

* * * * *